United States Patent [19]

McDonald et al.

[11] Patent Number: 5,193,101
[45] Date of Patent: Mar. 9, 1993

[54] ON-SITE SYSTEM FREQUENCY SHARING WITH TRUNKING SYSTEMS USING SPREAD SPECTRUM

[75] Inventors: James A. McDonald, Buffalo Grove; Richard A. Comroe, Dundee; Arun Sobti, Wheaton; Paul M. Bocci, Roselle; Robert W. Furtaw, Arlington Heights; Bradley M. Hiben, Glen Ellyn, all of Ill.

[73] Assignee: Motorola, Inc., Schaumburg, Ill.

[21] Appl. No.: 650,125

[22] Filed: Feb. 4, 1991

[51] Int. Cl.$^5$ .................................... H04K 1/00
[52] U.S. Cl. .................................. 375/1; 455/33.1; 455/33.4; 379/59
[58] Field of Search .............. 380/34; 375/1, 38; 379/59, 60; 455/33, 34, 59, 103, 33.1, 33.4, 34.1

[56] References Cited

U.S. PATENT DOCUMENTS

| | | | |
|---|---|---|---|
| 4,723,266 | 2/1988 | Perry | 455/33 X |
| 4,799,252 | 1/1989 | Eizenhöffer et al. | 455/33 X |
| 5,038,399 | 8/1991 | Bruckert | 455/33 |
| 5,040,238 | 8/1991 | Comroe et al. | 455/33 |
| 5,054,110 | 10/1991 | Comroe et al. | 455/33 |
| 5,056,109 | 10/1991 | Gilhousen et al. | 375/1 |

Primary Examiner—Tod R. Swann
Attorney, Agent, or Firm—Jon P. Christensen

[57] ABSTRACT

A way of allowing small, low-power communication units to reuse trunked system communication resources within the service coverage area of the larger trunked system without experiencing significant interference from the trunked system. The low power units (requestors and targets) avoid interference through spread spectrum transmissions.

14 Claims, 3 Drawing Sheets

ON-SITE SYSTEM FREQUENCY SHARING WITH TRUNKING SYSTEMS USING SPREAD SPECTRUM

TECHNICAL FIELD

This invention relates to the field of communication systems and more specifically to on-site systems.

BACKGROUND

Trunked mobile communication systems are known. Such systems typically allocate frequency pairs (transmit and receive) upon receipt of a request for a communication resource from a requesting communication unit. The requesting communication unit then tunes to the granted frequencies and begins transceiving. Such systems are termed frequency division multiple access (FDMA) systems.

Repeaters are provided at the trunked communication system base sites to receive signals from transmitting communication units and to re-transmit the signal. Repeaters are typically provided with relatively tall antenna and are capable of receiving signals from the extremes of the service coverage area. Also in part because of the tall antenna, a signal re-transmitted by the repeater is capable of being received by a target communication unit substantially anywhere within the service coverage area of the trunked communication system.

Once a frequency has been allocated for use, the communication transaction normally occurs through encoding of an audio signal onto a carrier signal consisting of the assigned frequency. Encoding of the audio signal may occur through a variety of methods. Simple encoding techniques include amplitude modulation (AM) and frequency modulation (FM). Trunked systems, in general, operate under FM encoding techniques. AM, on the other hand, is seldom used in trunking systems.

With the advent of digital signal processing (DSP) and associated digital techniques more sophisticated signal encoding methodologies have been developed and used in nontrunked radio systems. One of the developed methodologies is termed spread spectrum. As the name implies, spread spectrum is an encoding technique involving the use of a relatively broad range of frequencies to avoid interference.

Code division multiple access (CDMA) is one of the spread spectrum methodologies. CDMA, on the other hand, is comprised of two separate methodologies, direct sequence spread spectrum (DSSS) and frequency hopping. Frequency hoppers avoid interference by hopping through a range of frequencies, only transmitting on a particular frequency for a short period of time and transmitting redundant or error correction coding with the information signal.

DSSS, on the other hand, utilizes a high rate binary sequence to spread the bandwidth of the desired signal at the transmitter. The same sequence is then used at the receiver to reduce the bandwidth and recover the transmitted signal. The process of bandwidth reduction at the receiver provides suppression of undesired signals or noise thus providing similar rejection of interference as frequency hop spread spectrum signals.

Because spread spectrum systems disperse signals across a range of frequencies, interference is less a problem in such systems. Radio communication systems, in general, suffer from a variety of problems associated with interference from loss of system access to signal blocking. A need exists for a method to apply spread spectrum technology to conventional radio communication systems.

SUMMARY OF THE INVENTION

Pursuant to one embodiment of the invention a limited range (small-cell) spread spectrum communication system is constructed for use within the service coverage area of a larger (large-cell) trunked communication system. The large-cell system has a number of frequencies (communication resources) allotted for use within the large-cell system and which are allocated from time-to-time among requesting large-cell communication units. The small-cell communication system is constructed with a way of determining that a small-cell communication unit requires the establishment of a communication link between the communication unit and a small-cell transceiver. The small-cell system then allocates a number of communication resources to the small-cell unit for use in a sequential manner (automatic frequency hop basis) notwithstanding the simultaneous use of the communication resources by large-cell communication units.

The identity of re-used communication resources within the small-cell system is determined by a code entered into the small-cell resource controller. The code determines the communication resources to be used and in what order. Because the code may be changed at will, a number of small-cell communication systems may use the same communication resources simultaneously without mutual interference. The code used by small-cell communication systems in this embodiment is generated by reference to communication resource use within the large-cell system. It should be readily apparent that the code may be generated using any mathematical equation or operational algorithm.

The small-cell communication system is constructed to transmit and receive in time division duplex (TDD) format on the same communication resource used by a transmitting trunked communication unit (inbound resources). The sharing of inbound resources is possible whenever the trunked base site receives a sufficiently strong signal from trunked communication units relative to the small-cell systems user.

Pursuant to one embodiment of the invention small-cell communication units are constructed to operate on a multitude of communication resources in a sequential manner (frequency hopping) and indexed under control of the small-cell resource controller. A requesting small-cell communication unit (and target small-cell communication units) are allocated an initial communication resource (initial indexed communication resource) by the small-cell resource controller. The requesting small-cell unit (and any target units) immediately tune to the initially assigned resource and begin operation for an index interval. At the end of the index interval the requesting small-cell (and target units automatically index to the next resource on an indexing table of communication resources. Synchronization of requesting and target communication units is maintained by the small-cell controller.

Use of the frequency hopping technique allows a small-cell communication unit to operate in close proximity to a trunked communication unit without complete blocking of the small-cell unit's signal. If a communication resource is being shared by a nearly trunked communication unit then the small-cell signal is blocked only for the interval during which the small-cell unit operates on the shared resource. The result may be a momentary interference in the received small-cell signal. The use of redundancy or error correction coding may be utilized to eliminate disruption of communications by the momentary interference.

During each index, under the frequency hopping technique, a packet of information is transmitted from requestor to target and visa versa. Pursuant to one embodiment of the invention the audio signal transmitted between communication units is subjected to audio compression techniques. Audio compression, as known in the art, is a technique by which a continuous audio signal may be compressed into short, intermittent information packets. The information packets transmitted between communication units during each index interval under the invention may be comprised of two components. The first component may be a packet containing the most recently generated audio information transmitted between small-cell communication units. The second packet may be a duplicate of at least part of the audio information transmitted during the previous index interval. Other coding techniques may also be used in audio compression.

The repeated transmission of audio information allows for the successful transmission of audio signals even though alternate hops are completely blocked, without loss of audio information. For a listener to a small-cell communication to become aware of interference, at least two successive hops must be blocked through interference.

The indexing table of communication resources is maintained by the small-cell resource controller. Where a weak signal condition is detected by the trunked base site on a resource allocated to a trunked communication unit, notification of such weak signal condition is immediately communicated to the small-cell resource controller. Upon receipt the small-cell resource controller immediately removes the resource from the indexed list of communication resources (precluding use of the resource by small-cell units).

Removal of the resource from the indexed list of communication resources within the small-cell system prevents interference in trunked system operation by the small-cell system. When the weak-signal trunked communication unit terminates use of the resource, or, the trunked base site again detects a strong signal from the communication unit the resource is again included in the indexed list of communication resources available for use by small-cell communication units Pursuant to another embodiment of the invention a small-cell communication system is constructed using DSSS encoding techniques. In such a system at least one small-cell communication unit transmitting a DSSS signal would share at least some of the communication resources used by the large-cell system.

At least one receiving small-cell communication unit constructed to receive and decode the DSSS signal would receive the signal over the shared resource.

BEST MODE FOR CARRYING OUT THE INVENTION

Figure 1:
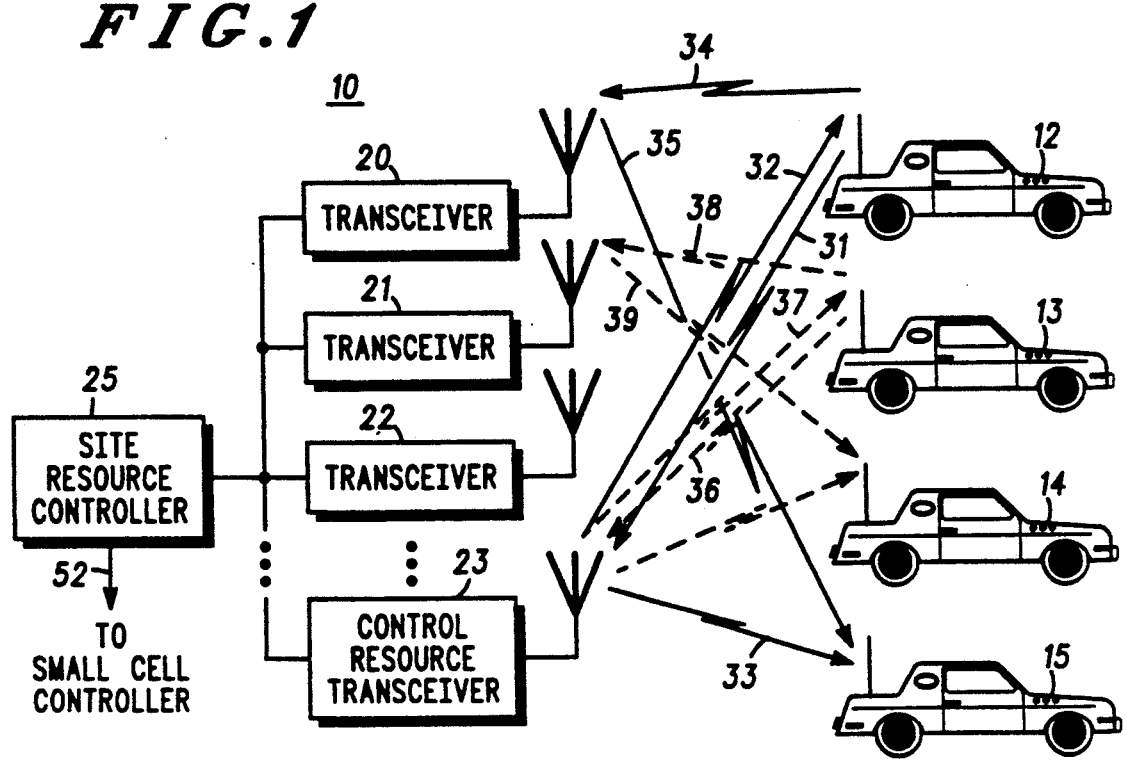
FIG. 1 comprises a block diagram of a single cell of a trunked communication system with two requesting communication units communicating with two target units within the same cell.

Referring now to FIG. 1, a single, large system cell of a trunked communication system is depicted generally by the number 10. The cell (10) generally includes a plurality of communication units (12 through 15) (as used herein "communication units" refers to mobile, units, or portable units), transceivers (20 through 22), and a site resource controller (25). The system also includes a control resource transceiver (23) to allow two-way transmission of system control information.

In general, to establish a call between two communication units operating in such a cell (10) a requesting unit (12) sends a data packet called an inbound signalling word (ISW) (31) on the inbound frequency allocated to the control resource transceiver (23). The ISW (31) typically contains the requesting communication unit's unique ID code plus the ID number of the target party (or parties) or group. The site resource controller (25) decodes the request, and transmits on the control resource transceiver (23) an appropriate resource grant outbound signalling word (OSW) (32) to the requesting communication unit (12). The requesting communication unit's (12) frequency grant OSW (32) causes it to move to the designated transmit frequency. If the target party is another mobile communication unit (15) located within the same cell, the resource controller at the same time also transmits an OSW (33) to the target unit identifying the receive frequency. When the requesting unit (12) initiates a voice transmission (34) the base site transceiver (20) receives the transmission (34) and re-transmits the voice signal on the receive frequency (35) to the target part (15).

If another communication unit (13) were to request service after initiation of the conversation between the two moblie communication units (12 and 15) then the situation shown in dotted lines in FIG. 1 would exist. FIG. 1 shows a requesting communication unit (13) tranmitting an ISW (36) to the site resource controller and receiving an OSW (37) defining a frequency grant through another transceiver (21). The target party (14) for the requesting communication unit (13) maybe (for example) in another area of the cell. The requesting communication unit (13) moves to the designated frequency and begins transmitting on the assigned frequency (38). The target communication unit (14) receives the frequency grant (37), moves to the designated frequency, and begins receiving the transmitted signal (39).

Figure 2:
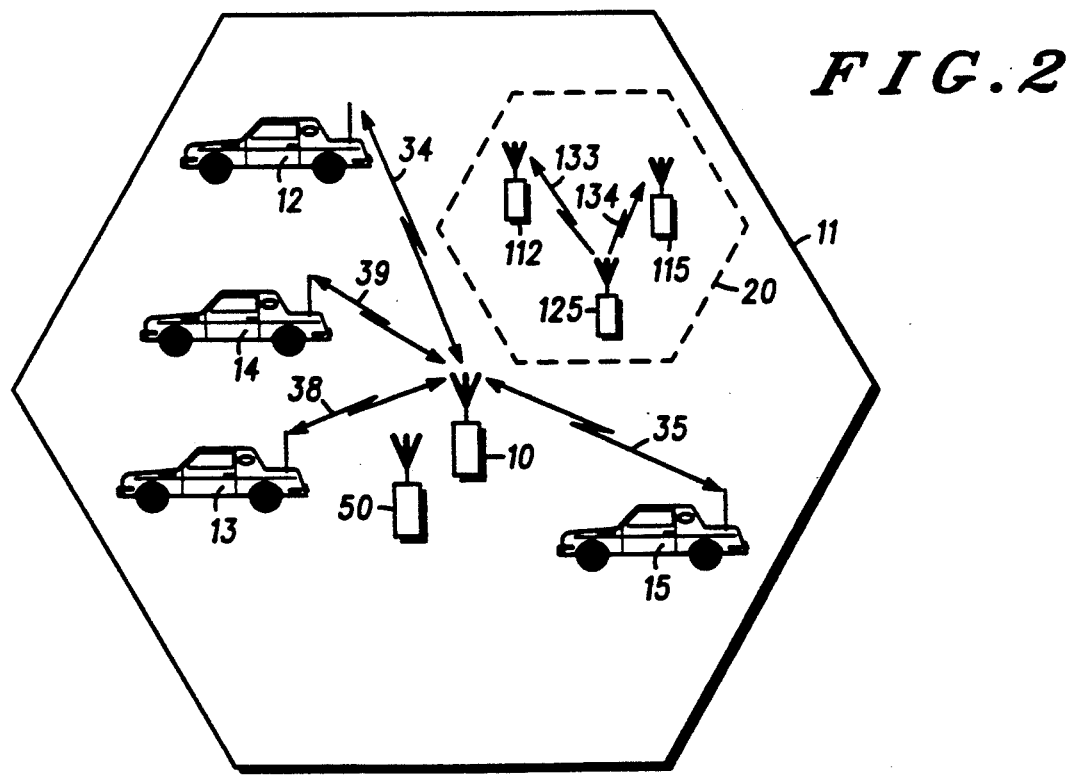
FIG. 2 depicts a single cell of a large cell system in a geographical context showing two sets of communication units in contact.

Shown in FIG. 2 is the situation substantially described in the previous example. The requesting communication unit (12) is shown to be at the edge of the service coverage area (11) of the cell (10). As shown, an on going conversation exists between the orginal two communication units (12 and 15). Also shown in the ongoing conversation between the second requesting communication unit (13) and a target (14) within the same cell. This second requesting communication unit (13) is shown to be in close proximity to the large-cell base site transceiver (20 in FIG. 1).

Pursuant to one embodiment of the invention, transceivers (or other dedicated receivers (50, FIG. 2)) at (or proximal to) the base sites are equipped for measuring the received signal strength from communication units. Where the received signal strength from nearby communication units (for example communication unit 13) exhibits sufficient strength, a control algorithm allows low-power small-cell communication systems located within the same cell to operate on certain shared frequencies.

A small-cell communication system (FIG. 3) has a similar functionality to the larger cellular system (10) but operates at a substantially reduced power level. Small-cell communication units (112 through 115), small-cell transceivers (120 through 122), and the small-cell control resources transceiver (123) operate in the region of typically ten milliwatts. Transceivers within the small-cell system (120 through 122) are also equipped for the transmission of control bits for synchronization of small-cell communication units. Communication units (112 through 115) as well as small-cell resource controller (125) are constructed to transmit and receive in a time division duplex mode on a communication resource selected from an indexed table of communication resources and indexed on an index interval.

Upon activation (from a deactivated state) a small-cell communication unit selects a communication resource from the sequencing table to monitor for control activity. Sequencing, at this point, is not appropriate because the small-cell communication unit has no way to determine the location of the sequencing control resource within the sequencing table. On the other hand, if the small-cell unit statically monitors a resource, the sequencing control resource will eventually sequence through the resource identifying its presence to the small-cell unit by its transmissions.

Upon detecting a sequencing control resource of which the small-cell unit is a part, the small-cell unit immediately begins to sequence in coarse synchronization with the sequencing control resource.

Complete synchronization of the small-cell unit is achieved through the use of a repetitive code transmitted by the small-cell resource controller and through which the small-cell unit first achieves clock synchronization. The small-cell communication unit then achieves complete synchronization through the use of a sliding correlator. The small-cell unit verifies synchronization to the small-cell resource controller by echoing a code transmitted by the small-cell resource controller Once synchronized with the sequencing control resource the small-cell unit remains in that state until the small-cell unit initiates a call and receives an allocation or is notified by the sequencing resources controller that it is the target of a call.

Upon initiating a call the small-cell unit transmits to the sequencing resource controller, under a TDD format, a resource request over the sequencing control resource. The small-cell resource controller on the sequencing control resource (also under a TDD format) responds with the ID of a resource within the sequencing table (initial indexed communication resource). The requesting small-cell unit moves to the resource and after an index interval begins sequencing through the sequencing table. Transmissions can begin as soon as the small-cell unit moves to the initial indexed communication resource (b).

A requesting small-cell communication unit (112, FIG. 3) transmits an ISW (131) to receives a frequency grant OSW (132) from a small-cell resource controller (125), substantially as described above. Two-way transmissions (133 and 134) between a requesting unit (112) and a target communication unit (115) also occurs substantially as described above.

As previously mentioned one difference between the small-cell system and the trunked system is that in the small-cell system a requesting communication unit and any target communication units operate on a single frequency using time division multiplexing. Time division multiplexing in a small-cell system allows a requestor and a target to share a single frequency. As contemplated a requesting small-cell communication unit occupies the first of two slots in a TDM format on an indexing resource and a target occupies the second. (Where a small-cell requestor (112) and target (115) are serviced from the same small-cell transceiver 120 then the transceiver acts as a repeater.) The small-cell control resource is similarly divided with control resource transmissions (allocations) occupying the first slot and communication unit transmissions (resource requests) occupying the second.

Small-cell communication units, because of the reduced powder levels, are constructed to transmit from a few feet to a few hundred feet to service communication needs within a limited geographic area such as a manufacturing facility, a shopping mall, or other commercial or residential facility.

Shown in FIG. 2 is a small-cell communication system having a service coverage area (20) operating within the previously described trunked communication system. Communication units (12 and 15) and (13 and 14) are engaged in a two-way conversation supported by larger system infrastructure. The site resource controller (25) periodically measures a signal quality factor (signal strength) of all communication units transmitting via larger system infrastructure and transfers the results of those measurements by wireline (52 in FIGS. 1 and 3), or otherwise, to the small-cell communication controller (125).

Figure 3:
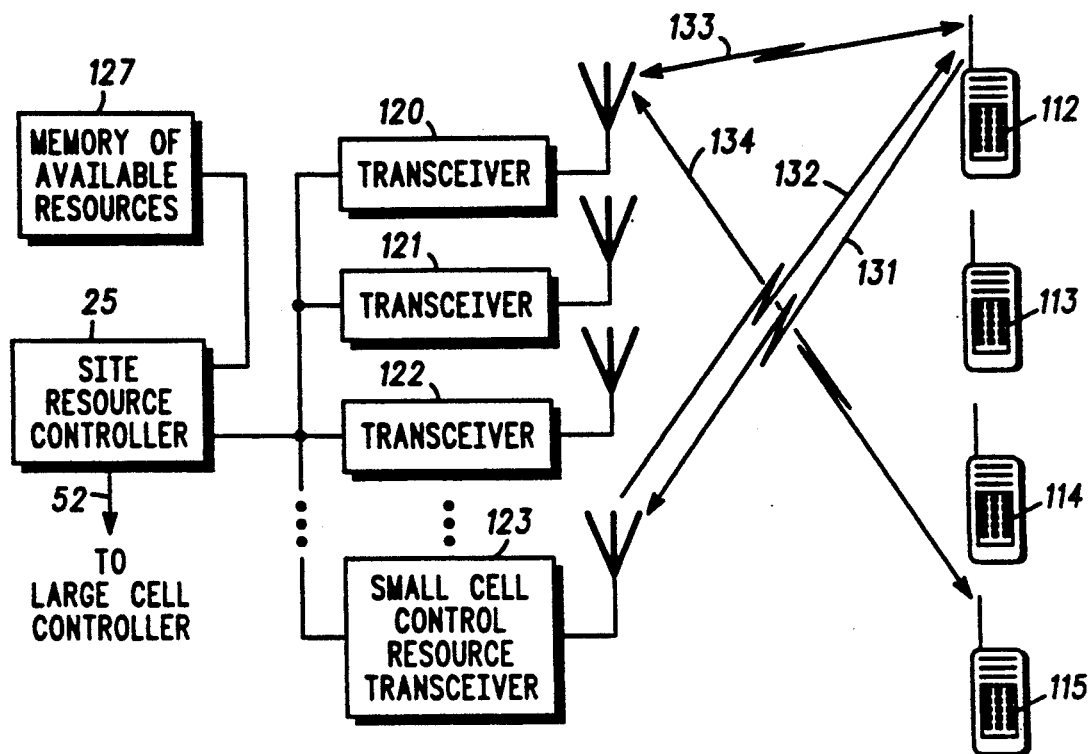
FIG. 3 comprises a block diagram of a single cell of a small-cell communication system.

In the example (FIG. 2) one communication unit (13) is approximately equidistant with the small-cell system to the base site (25). Because of the approximate equidistant locations and the power level of the mobile being several orders magnitude larger than the small-cell system, simultaneous re-use of the resource can occur withou interference. The re-use of the resource (38) granted to communication unit (13) by the small-cell system would not interfere with reception by the base size of communication signals transmitted by the communication unit (13). The small-cell controller under these conditions may re-allocate the granted resource within the samll-cell system. In FIG. 3 re-use of the resource (38) is shown in a simultaneous conversation between small-cell units (112 and 115) over re-used communication resources (133 and 134). Different reference numbers (38, 133, and 134) are used in the drawing (FIG. 2) for the same communication resource because two of the communication resources (133 and 134) are time division mulitplexed and the third communication resource (38) is not.

In some cases re-use of resources within the small-cell system may not be appropriate. One exmple of this is the control resource used by the resource controller in the large system. Another example is the previously mentioned situation where a communication unit is transmitting in the large system with a signal strength below a minimum threshold.

To allow for the selective re-use of frequencies within the small-cell system a number os strategies are used. On start-up of the small-cell system the ID numbers of available communication resources are manually entered into a table of communication resources within a memory (FIG. 3, 127). Resources that become unusable during normal operation because of weak signal conditions, or otherwise, are deleted from the table in memory (FIG. 3, 127) by the small-cell resource controller.

The indentification of communication resources available to the small-cell system begins with the periodic measurement of the signal quality factor (signal strength) within each transceiver in the large system by a received signal strength indicator (RSSI). As previously mentioned the value of the RSSI is then transferred to a receiving means within the small-cell system by wireline (52 in FIGS. 1 and 3) or otherwise. The RSSI transfer to the small-cell system is in the form of a digital word identifying the communication resource and the RSSI value associated with the resource. An indication of the value transferred in shown in the large cell flow chart (FIG. 5).

Figure 5:
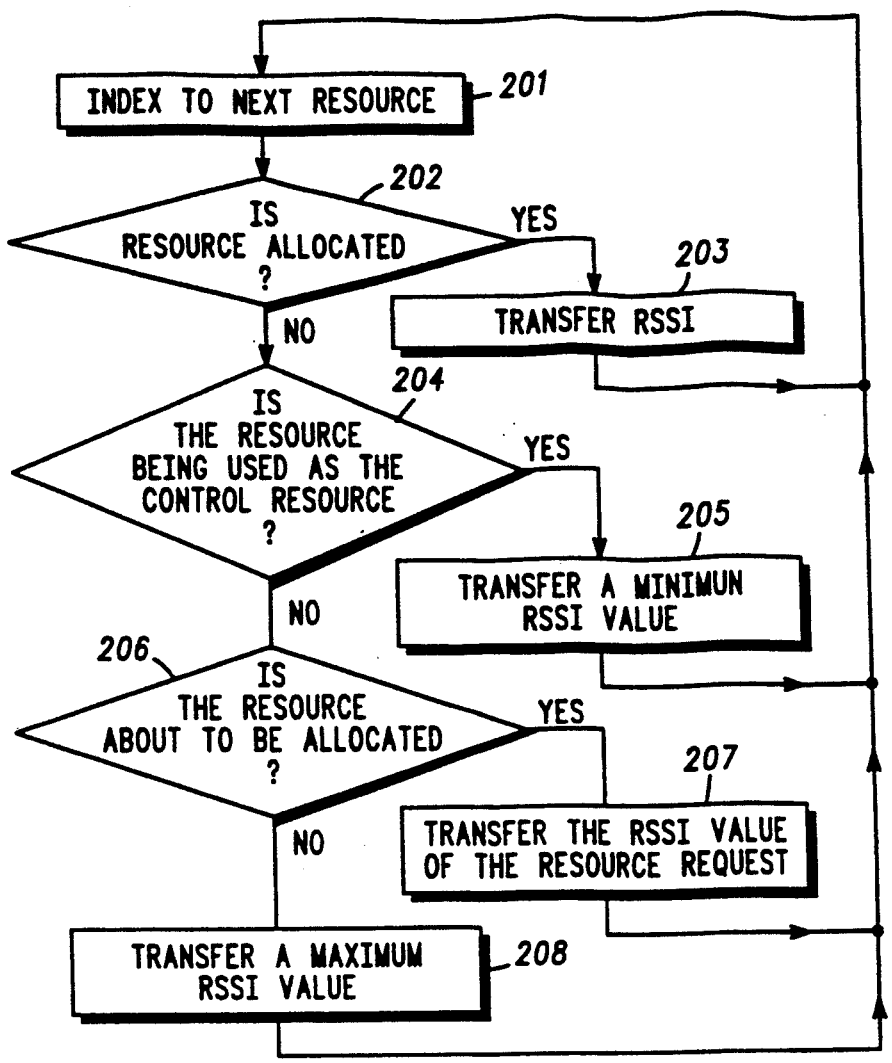
FIG. 5 comprises a flow chart for the transfer of signal quality factors to the small-cell system.

As shown (FIG. 5), if the resource was previously allocated the measured signal strength value, RSSI, is transferred (FIG. 5, 202, 203). If, on the other hand, the resource is being used as a control resource, then a minimum value is transferred (FIG. 5, 204, 205). The minimum value is used to prevent operation on the resource by any unit within a small-cell system.

If a resource is about to be allocated (FIG. 5, 206) then the measured RSSI of the ISW requesting service is transferred (FIG. 5, 207). If the communication resource is not being used by the large system (FIG. 5) than a maximum RSSI value is transferred (FIG. 5, 208) to the small-cell system. The maximum value indicates to the small-cell system that the resource may be used at will.

Figure 6:
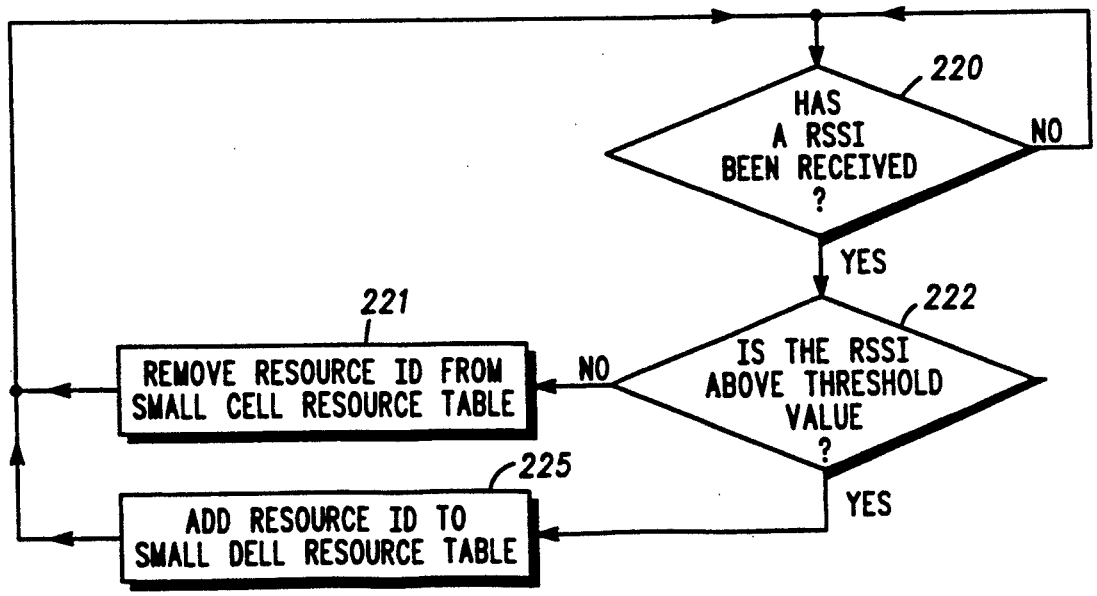
FIG. 6 comprises a flow chart for the determination of communication resource availability within the small-cell system.

Upon receipt of the RSSI ( FIG. 6, 220) by the resource controller in the small-cell system a determination of availability to the small-cell system is made. Shown (FIG. 6) is a flow chart of the process steps in determining small-cell availability. As shown, if the RSSI does not exceed the threshold value (FIG. 6, 222) then an entry is immediately made in the resource table within the small-cell resource controller to perclude use within the small-cell system (FIG. 6, 221).

Updates to the resource table within small-cell communication units, in one embodiment, are made under one of two possible procedures. First, inactive small-cell communication units monitoring the small-cell resource controller receive updates over the control channel and immediately implement the update to the internal resource table. Active small-cell communication units, monitoring locations on the indexing resource are notified of updates through the use embedded signaling tansmitted through active small-cell transceivers. Active small-cell communication units, upon receiving updates, complete the current sequence before implementing the update to the internal resource table. Completion of the current sequence by active units avoids the problem of a small-cell unit sequencing through a vacant (nonexistent) channel.

In another embodiment of the invention the requesting communication unit (112) may transmit an OSW (131) identifying a target (not shown) in another small-cell system or a target accessed through a PSTN interconnect (not shown). In such a case the indexed resource over which communication would occur between the requestor (112) and the target (not shown) would occur in a full duplex mode of operation through the transceiver (120).

In another embodiment of the invention small-cell communication units are constructed using DSSS signal processing technology. The use of DSSS transmissions within the small-cell system somewhat limits frequency re-use with the large-cell system. Since DSSS transmissions result in simultaneous transmissions on a contiguous block of frequency spectrum then a block of spectrum must be reserved for re-use by the small-cell system. One method of achieving re-use with the large-cell system is to reserve a block of spectrum for small-cell DSSS use and to reserve a second block of spectrum for use by the large-cell control communication resource and for weak signal large-cell communication units.

Figure 4:
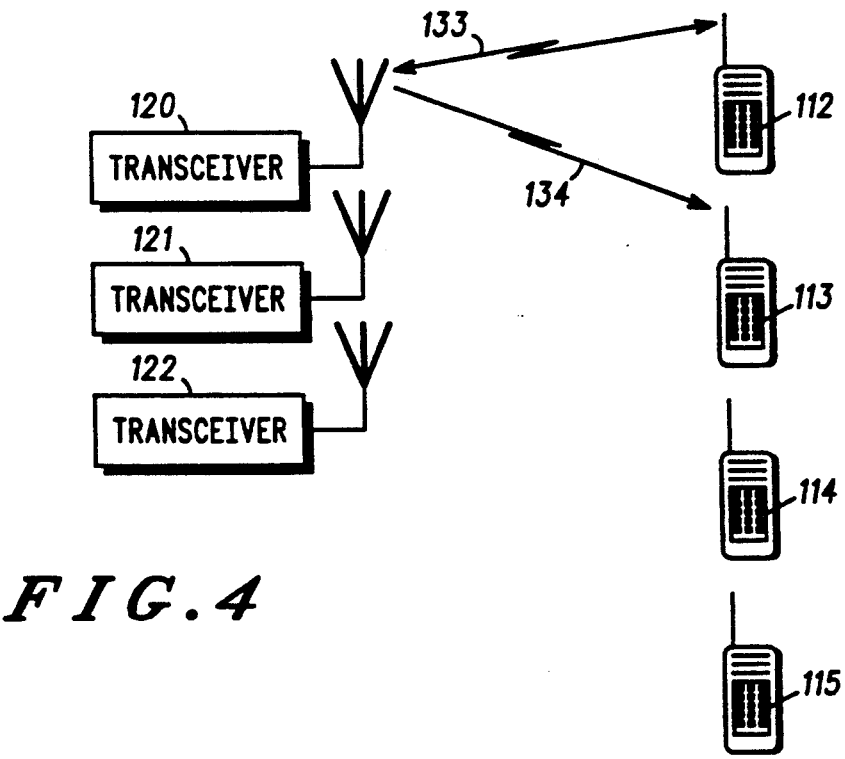
FIG. 4 depicts a representation of indexed communication resource use by a frequency hopping communication system.

Construction of the small-cell communication system (FIG. 4), on the other hand, becomes less complex. In one embodiment of the invention the DSSS system comprises a transceiver (120) and a number of communication units (112 through 115). Communication units (112 through 115) are constructed with substantially identical pseudo random number generators for encoding before transmission as are transceivers (120 through 122). The transceiver (120) is equipped with a receiver with a substantially identical generator as in the transmitter of communication unit (112). A signal (133) transmitted by a requesting communication unit (112) is received and decoded by the receiver within transceiver (120). The signal is then re-encoded within the transceiver (120) using a second pseudo random number generator. The received signal (133) is then retransmitted (134) to a receiving communication unit (113). The receiving communication unit (113) is equipped with a receiver containing a substantial identical pseudo random number generator as the transmitter within the transceiver (120).

Since the ability to decode DSSS signals is dependent upon having the proper pseudo random number generator a number of transceivers (120 through 122) could be in simultaneous operation transceiving signals between different communication groups within the small cell system. In this case transceivers (120 through 122) each contain a differently coded pseudo random number generator for operation with a different small-cell communication group.

What is claimed is:

1. A communication system located within a service coverage area of trunked communication system, wherein the trunked communication system comprises:

A) a plurality of communication resources, each resource having a frequency pair;

B) means for measuring a signal quality factor of at least one transmitting communication unit; and, C) means for transferring the signal quality factor to at least one small-cell receiving means;

said communication system comprising at least one small-cell communication system having:

A) a plurality of small-cell communication units each with means for communicating in a time division duplex format on an indexed communication resource from an indexing table of communication resources for an index interval;
B) at least one small-cell base site having at least one transceiver and a resource controller with means for communicating in a time division duplex format on an indexed control resource from an indexing table of communication resources for an index interval;
C) means for receiving the signal quality factor from the trunked communication system;
D) means for comparing the signal quality factor with a threshold to produce a result; and ,
E) means allocating an initial indexed communication resource from the indexing table of communication resources based at least in part upon the result to an at least one requesting small-cell communication unit of the plurality of communication units.

2. The communication system as in claim 1 wherein the indexing table of communication resources is periodically updated by the small-cell resource controller in response to the transmission of control information to the small-cell communication unit.

3. The communication system as in claim 1 wherein an indexed communication channel of the indexing table of communication resources is designated as a small-cell indexed control resources.

4. The communication system as in claim 3 wherein the initial indexed communication resource is transmitted to the at least one small-cell communication units over an indexed control channel.

5. The communication system as in claim 4 wherein inactive small-cell communication units monitor the indexed control resources for control information.

6. The communication system as in claim 5 wherein a requesting small-cell communication unit transmits requests and receives resource allocations on the indexed control resource.

7. The communication system as in claim 1 wherein resources granted in the large cell system to weak-signal communication units are deleted from the indexing table of communication resources in the small-cell system.

8. A method of re-using communication resources within a service coverage area of a trunked communication system, said trunked communication system having:
A) a plurality of communications units;
B) a plurality of communication resources, each resource having a frequency pair;
C) at least one small-cell communication system, wherein the small-cell communication system has:
   i. a plurality of small-cell communication units each with means for performing time division duplex communication on an indexed communication resource of an indexing table of communication resources incremented at an index interval;
   ii. at least one small-cell base site having a small-cell resource controller; and
   iii. means for allocating an initial indexed communication resource of the indexing table of communication resources,
said method comprising the steps of:
A) monitoring an indexing control resource by a small-cell communication unit as the indexing control resource indexes through a table of indexing communication resources;
B) transmitting a resource request from the small-cell communication unit to a means for allocating an initial indexed communication resource on the indexing control resource;
C) receiving a resource grant of an initial indexed communication resource;
D) tuning to the initial indexed communication resource; and,
E) indexing synchronously within the table of indexing communication resources from the initial indexed communication resource.

9. The method as in claim 8 wherein updates to the indexing table of communication resources is periodically transmitted to the small-cell communication units by the small-units by the small-cell resource controller.

10. The method as in claim 8 wherein an indexed communication resource of the indexing table of communication resources is designated as a small-cell indexed control resource.

11. The method as in claim 10 wherein the initial indexed communication resource is transmitted over indexed control resource to the small-cell communication units.

12. The method as in claim 11 wherein inactive small-cell communication units monitor the indexed control resource for control information.

13. The method as in claim 11 wherein target small-cell communication unit receive resource allocations on the indexed control resource.

14. The method as in claim 8 wherein resources granted in the large cell system to weak-signal communication units are deleted from the indexing table of communication resources in the small cell system.

* * * * *

UNITED STATES PATENT AND TRADEMARK OFFICE
CERTIFICATE OF CORRECTION

PATENT NO.  : 5,193,101
DATED       : Mar. 9, 1993
INVENTOR(S) : McDonald, James A. et al.

It is certified that error appears in the above-identified patent and that said Letters Patent is hereby corrected as shown below:

Column 4, line 53, Best Mode For..., change "tranmitting" to transmitting

Column 4, line 68, Best Mode For..., change "on going" to ongoing

Column 5, line 1, Best Mode For..., change "in" to is

Column 6, line 7, Best Mode For..., between "to" and "receives" insert and-to read"to and receives"

Column 6, line 57, Best Mode For..., change "size" to site

Column 6, line 60, Best Mode For..., change "samll-cell" to small-cell

Column 7, line 9, Best Mode For..., change "os" to of

Column 7, line 42, Best Mode For..., change "than" to then

Signed and Sealed this

Thirtieth Day of November, 1993

Attest:

BRUCE LEHMAN

Attesting Officer

Commissioner of Patents and Trademarks